Patented Sept. 6, 1938

2,128,973

UNITED STATES PATENT OFFICE 2,128,973

PROTECTIVE COMPOSITION FOR FRUITS AND THE LIKE

Wendell H. Tisdale, Cleveland Heights, Ohio, and Albert L. Flenner, Wilmington, Del., assignors, by mesne assignments, to E. I. du Pont de Nemours & Company, Wilmington, Del., a corporation of Delaware No Drawing. Application June 27, 1935, Serial No. 28,700

10 Claims. (Cl. 134—1)

This invention relates to self-emulsifying compositions of matter useful as coating compositions in emulsified form and particularly for coating fruits, nuts, nursery stock, and the like for reducing desiccation and decay, and for improving the condition and appearance of the products.

Coating agents for application to fruits, nuts, and other products, for retarding desiccation and decay, and for improving the appearance and condition of the products are coming into common use. Paraffin and other waxes, such as carnauba wax, are being used for this purpose. Rosin, gelatin, and various other products have been employed. The most efficient means of applying waxes in the past has been in molten form which is expensive and likely to cause injury to fruit and the like if the temperature is not properly controlled. More recently, emulsions of waxes have been prepared which can be applied as sprays or dips. These emulsions tend to break in natural and hard waters and in the presence of weak acids such as those present in fruits. For example, when citrus fruits are dipped in a bath containing the ordinary wax emulsions, the acids exude from broken fruit, dissolve in the bath, and soon break the emulsions causing them to separate and become unfit for further use.

An object of the present invention is to provide compositions of matter which readily emulsify, when mixed with water, to produce a stable coating composition for coating fruits, nuts, nursery stock, and the like. A further object is to provide emulsions useful as coating compositions which are stable in natural, hard waters and weak acids. A still further object is to provide such compositions which may be modified to produce either a sticky coating or a smooth non-tacky coating, as desired. Another object is to provide compositions which can be employed in conjunction with fungicides, such as borax, and which will be stable in the presence of such materials. Other objects are to provide methods of preparing such coating compositions. Still other objects are to provide new compositions of matter and to advance the art. Further objects will appear hereinafter.

These objects may be accomplished in accordance with our invention which comprises placing rosin in a miscible form in high percentages in accordance with our formula which comprises essentially a mixture of rosin, wetting or dispersing agent, alcohol, and water in about the proportions of 15 to 40 parts of rosin, 10 to 35 parts of wetting agent, 20 to 50 parts of alcohol, and 5 to 20 parts of water. A composition prepared in accordance with this formula forms a clear solution which emulsifies with water upon mere admixture therewith.

The rosin in our formula may be replaced in whole or in part by rosin esters of glycerol or diethylene glycol.

The wetting agent employed in our formulae must be a member of the group consisting of alkyl-naphthalene-alkali-sulfonates, and sulfation products of aliphatic compounds which contain an alcoholic hydrocarbon radical of more than seven carbon atoms. Other types of wetting agents cannot be employed in our formulae if a composition is to be obtained which will readily emulsify with water to form a stable emulsion the presence of hard water and acid.

The sulfation products of aliphatic compounds which contain more than seven carbon atoms are obtained by reacting concentrated sulfuric acid, oleum, chlorosulfonic acid, or other sulfuric acid derivatives of strongly sulfonating properties, upon aliphatic compounds which contain an alcoholic hydrocarbon radical of more than seven carbon atoms. According to the best experimental evidence available, the sulfation products of the alcohols are sulfuric acid esters of the probable formula $R—O—SO_3H$ with the possible inclusion of minor amounts of sulfonic acids. When esters of unsaturated alcohols are sulfated, the sulfuric acid adds itself to the double bond, but the evidence available is insufficient to decide whether the products are sulfuric acid esters, sulfonic acids, or a mixture of such compounds.

As far as applicability to the purposes of our invention is concerned, the reaction products obtained by the action of sulfuric acid, etc., upon the alcohols or upon the unsaturated esters are entirely equivalent, and for the purposes of our invention we choose to call these products the sulfates of aliphatic compounds having an alcoholic radical of more than seven carbon atoms. We believe that it is the presence of an aliphatic alcoholic hydrocarbon radical of more than seven carbon atoms and of a salt forming sulfur-oxygen group in the molecule that determines the applicability of these compounds to our purposes.

As examples of aliphatic compounds from which the sulfates useful in our invention are derived, we may mention hexyl, octyl, decyl, oleyl, stearyl, cetyl, lauryl, carnaubyl, melissyl, myristyl, linoleyl, and ricinoleyl alcohols.

As additional examples of aliphatic compounds, the sulfation products of which serve as wetting agents according to our invention, we may mention aliphatic esters and ethers which contain an alcoholic radical of at least eight carbon atoms. We may use, for instance, acetyl-oleyl-alcohol, stearo-glyceryl-ether, oleo-glyceryl ether, and palmetto-glyceryl ether. As still further examples of starting materials, we may mention aliphatic compounds which contain a chloro or other halogen group. In this connection it should be noted that when oleyl alcohol, for instance, is sulfated with chlorosulfonic acid, the treatment probably results in the introduction of a chloro-group into some of the hydrocarbon radicals.

It is noted that ordinarily the starting material to be sulfated is a mixture of aliphatic compounds. This follows from the fact that the alcohols, esters, and ethers of the types mentioned are produced commercially as mixtures and not as pure compounds, and it would be a costly and useless procedure to separate a particular alcohol, for instance, from others equally suitable.

The sulfates of aliphatic compounds such as those above mentioned form salts with such compounds as sodium carbonate, sodium hydroxide, potassium hydroxide, ammonium hydroxide, oxides and hydroxides of lithium, magnesium, etc., and with such amines as pyridine, piperidine, cyclo-hexylamine, mono- and dialkyl cyclohexyl-amines, dicyclohexylamines, mono-, di-, and trialkylamines, and mono-, di-, and trialkylolamines. It is in the form of such salts that we usually add the sulfates to our novel composition. It is noted, though obvious, that the expression "sulfation products of an aliphatic compound which contains an alcoholic hydrocarbon radical of more than seven carbon atoms" is generic to salts of the type above discussed. The commercial salts frequently contain rather large amounts of impurities such as sodium sulfate, sodium chloride, etc., but these impurities do not interfere with the usefulness of the sulfates for the purposes of our invention.

The alcohol employed must be either methyl alcohol, ethyl alcohol or propyl alcohol. Other alcohols such as isopropyl alcohol, butyl alcohol, and the like cannot be employed to produce compositions having the desired properties of our compositions.

The compositions produced according to the above formula are clear solutions which may be diluted with large volumes of water to produce stable emulsions or dispersions which will not break in hard waters or in the presence of acids such as are present in citrus fruits. When emulsions or dispersions produced from our compositions are applied to fruits, nuts, nursery stock, or foliage of trees and plants, they form coatings which adhere to the surfaces in the form of a sticky film. They are particularly adapted for addition to fungicidal and insecticidal spray materials and, when so used, hold the fungicide or insecticide to the surfaces sprayed therewith.

When such a sticky coating is desired, it is generally preferred to replace part of the alcohol with a paraffin oil of 65 to 120 seconds Saybolt at 100° F. Up to three-fifths of the alcohol may be replaced with such oil. However, the alcohol and oil combination must amount to 20 to 50 parts and at least two-fifths of the combination must consist of alcohol. The paraffin oil, when employed, increases the stickiness of the coating and causes it to retain such properties over a longer period of time.

It is frequently desirable to reduce the tackiness of the coating and to produce a smooth non-tacky coating on fruits, nuts, nursery stock, and the like to improve the appearance thereof and to protect them from desiccation and decay. In such case, there may be added to the formula up to 20 parts of a higher aliphatic alcohol which is immiscible with water and solid at ordinary temperatures. Such alcohols contain at least 15 carbon atoms and, preferably, are primary monohydric alcohols. Representative alcohols are stearyl, cetyl, ceryl, myricyl, and octadecyl alcohols. Of these, crude or technical stearyl alcohol, generally known to the trade as stenol and containing minor amounts of other alcohols mostly cetyl alcohol, has given the best results. These alcohols may be present up to 20 parts and may be present in amounts equal to that of the rosin. Also, the amount of the rosin and higher alcohol together must not amount to more than about 40 parts. When these higher alcohols are employed, the paraffin oil is generally not employed and will generally be found to be undesirable.

Our compositions containing the higher alcohols are clear solutions which are stable on standing and which can be diluted with large volumes of water to form stable emulsions or dispersions which do not break in the presence of hard water or acids such as are found in citrus fruits. When they are applied to fruit and the like in the proper dilutions, they form smooth coatings of reduced tackiness. In fact, when the relative proportion of rosin and higher alcohol amounts to approximately equal parts of rosin and alcohol, the coating is non-tacky.

We have found that the ingredients and the relative proportions as given above are important. If other wetting agents or other lower molecular weight alcohols are substituted for those specified, a clear homogeneous solution which will readily emulsify with water and particularly with hard and acidic water will not be produced. When such other wetting agents or alcohols are employed, it will be impossible to obtain a homogeneous mixture, or the mixture will separate on standing. Also, if such other wetting agents or alcohols are employed, some of the ingredients will separate out on diluting with water, particularly if the water is hard or contains acids.

Furthermore, if the ingredients or the relative proportions thereof are varied to any material extent outside of the ranges given above, a clear stable solution readily emulsifiable with water will not be produced. For example, the rosin, wetting agent, and alcohol cannot be added to a large volume of water to obtain the desired emulsion. On the other hand, if the ingredients are mixed in accordance with our formula, the resulting clear solution may then be added to a large volume of water and readily mixed therewith to form a stable emulsion.

In order to illustrate our invention and the preferred embodiments thereof, the following examples are given.

Example I

A preferred composition was prepared according to the following in which the parts are by weight:

| | Parts |
|---|---|
| Rosin | 20 |
| Crude stearyl alcohol | 20 |
| Technical octyl sodium sulfate | 10.5 |
| Ethyl alcohol | 30 |
| Water | 19.5 |

The composition was warmed to about the melting point of the rosin to aid in mixing. A similar procedure was followed also in the succeeding examples. The composition of this example was a clear solution which readily emulsified with water. The emulsion was particularly desirable for producing a smooth, non-tacky coating on fruits, nuts, nursery stock, and the like. The emulsion was very stable, and, as will be pointed out hereinafter, borax and the like can be used with it without causing the emulsion to break.

Example II

A composition was prepared from the following ingredients mixed in the indicated proportions in which the parts are by weight.

| | Parts |
|---|---|
| Rosin | 15 |
| Crude stearyl alcohol | 15 |
| Ethyl alcohol | 47 |
| Sulfation product of oleyl acetate | 12 |
| Sodium salt of a sulfation product of a commercial mixture of even numbered straight chain alcohols from $C_{12}$ to $C_{18}$ | 6 |
| Water | 5 |

This composition was a clear solution which readily emulsified with water upon mixing therewith. The emulsion was found to be particularly desirable for producing a smooth coating on fruits, nuts, nursery stock, and the like. The coating so produced was non-tacky and capable of preventing desiccation and decay of the coated materials over extended periods of time and of materially improving the apearance thereof.

Example III

A composition was prepared as follows:

| | Parts |
|---|---|
| Rosin | 20 |
| Rosin ester of diethylene glycol | 20 |
| Paraffin oil | 15 |
| Sulfation product of oleyl acetate | 24.5 |
| Ethyl alcohol | 10 |
| Water | 10.5 |

The resulting mix was a clear solution, readily forming a stable emulsion when mixed with a large amount of water. The resulting emulsion, when sprayed on fruit, nuts, nursery stock, and the foliage of trees and plants, adhered to the surfaces thereof tenaciously to form a sticky coating. This composition is particularly desirable for use as a spreading and sticking agent to be added to insecticidal and fungicidal spray materials.

Example IV

A composition consisting of the following ingredients was prepared:

| | Parts |
|---|---|
| Rosin | 20 |
| Rosin ester of diethylene glycol | 20 |
| Paraffin oil | 15 |
| Isopropyl naphthalene sodium sulfonate | 17.5 |
| Ethyl alcohol | 10 |
| Water | 12 |

This was a clear solution readily emulsifiable with water to produce a stable emulsion. The resulting emulsion produced a tacky coating on the materials treated therewith. This composition is particularly useful as a spreading and sticking agent to be added to insecticidal and fungicidal spray materials.

Example V

A composition was prepared in accordance with the following formula:

| | Parts |
|---|---|
| Rosin | 30 |
| Technical stearyl alcohol | 10 |
| Sulfation products of oleyl acetate | 14 |
| Sulfate ester of oleyl alcohol | 8 |
| Ethyl alcohol | 30 |
| Water | 8 |

Upon mixing, these ingredients formed a clear solution readily emulsifiable with water. The resulting emulsion was useful as a coating agent to produce a smooth non-tacky coating on fruits, nuts, nursery stock, and the like when diluted in proper proportions.

Example VI

A composition was prepared in accordance with the following formula:

| | Parts |
|---|---|
| Rosin | 30 |
| Crude stearyl alcohol | 10 |
| Sulfation product of oleyl acetate | 24.5 |
| Ethyl alcohol | 25 |
| Water | 10.5 |

This produced a clear solution readily emulsifiable with water to form an emulsion which would produce a smooth non-tacky coating on fruit, nuts, nursery stock, and the like when treated therewith.

For the prevention of blue mold and certain other fungous decay in treated fruit or nursery stock, fungicides suited for the purpose may be incorporated either in the composition or in the water emulsion of the products when they are diluted for application.

Example VII

To the composition given in any of the foregoing examples may be added up to 5% or more of tetra ethyl thiuram monosulfide which is soluble in the mixture and which has been found to be an excellent fungicide when used in the proportions of about 2 to 5%.

Other fungicides soluble in the mixture may also be used, but only those safe on food products should be employed in fruit coating compositions.

Borax is commonly used for treating citrus fruit to prevent fungous decay in storage and transit. Because of the ability of these emulsions to withstand hard waters, borax may be dissolved in the water or in the emulsion in sufficient strength to serve as a disinfectant at the time the composition is diluted for application.

Example VIII

Compositions used for coating fruit, such as our preferred composition of Example 1, may be diluted in a 4% borax solution in preparing the emulsion for application. It is preferable to dissolve the borax in the water before mixing in the coating composition.

For the treating of nursery stock and other items not used for food, a wider range of fungicides is available, both for including in the composition and for dissolving in the water before adding the composition.

Example IX

To the coating compositions above disclosed may be added 0.5% to 1.0% of ethyl mercury oleate or phenyl mercury oleate which is sufficient for disinfecting purposes. More could be added if needed. Copper oleate, copper resinate, and other compounds of similar solubility could be used.

Water soluble copper, mercury, and organic disinfectants can likewise be used in the water employed for diluting the compositions for application to articles not used for food.

The compositions prepared in accordance with our invention form emulsions or dispersions which are stable in the presence of natural, hard waters and weak acids. Hence, they have all the advantages of the prior wax emulsions and the like and also many advantages thereover.

While we have disclosed the preferred embodiments of our invention, it will be apparent to those skilled in the art that many variations and changes may be made therein without departing from the spirit thereof. Accordingly, the scope of this invention is to be limited solely by the appended claims construed as broadly as is permissible in view of the prior art.

We claim:

1. A self-emulsifying composition of matter useful as a coating composition in emulsified form characterized in emulsified form by its stability in the presence of either weak acids or the impurities of hard or natural water or in the presence of both which comprises in admixture about 15 to about 40 parts of at least one member of the group consisting of rosin, glycerol esters of rosin and diethylene glycol esters of rosin, about 10 to about 35 parts of at least one wetting agent of the group consisting of sulfation products of aliphatc compounds which contain an alcoholic radical of more than 7 carbon atoms and alkylnaphthalene-alkali-sulfonates, about 20 to about 50 parts of a composition consisting of from about two-fifths to five-fifths of at least one primary monohydric alcohol of not more than three carbon atoms, the balance being a paraffin oil, and about 5 to about 20 parts of water, all parts being by weight.

2. A self-emulsifying composition of matter useful as a coating composition in emulsified form characterized in emulsified form by its stability in the presence of either weak acids or the impurities of hard or natural water or in the presence of both which comprises in admixture about 15 to about 40 parts of at least one member of the group consisting of rosin glycerol esters of rosin and rosin ester of diethylene glycol, about 10 to about 35 parts of at least one wetting agent of the group consisting of sulfation products of aliphatic compounds which contain an alcoholic radical of more than 7 carbon atoms and isopropyl - naphthalene - sodium - sulfonate, about 20 to about 50 parts of a composition consisting of from about two-fifths to five-fifths of at least one primary monohydric alcohol of not more than three carbon atoms, the balance being a paraffin oil, and about 5 to about 20 parts of water, all parts being by weight.

3. A self-emulsifying composition of matter useful as a coating composition in emulsified form characterized in emulsified form by its stability in the presence of either weak acids or the impurities of hard or natural water or in the presence of both which comprises in admixture about 15 to about 40 parts of at least one member of the group consisting of rosin, glycerol esters of rosin and di-ethylene glycol esters of rosin, up to about 20 parts of at least one aliphatic alcohol containing at least 15 carbon atoms, the alcohol and rosin combined amounting to not more than about 40 parts and the rosin comprising at least half of the combination, about 10 to about 35 parts of at least one wetting agent of the group consisting of sulfation products of aliphatic compounds which contain an alcoholic radical of more than 7 carbon atoms, and alkyl-naphthalene-alkali-sulfonates, about 20 to about 50 parts of at least one primary monohydric aliphatic saturated alcohol of not more than 3 carbon atoms, and about 5 to about 20 parts of water, all parts being by weight.

4. As a spreading and sticking agent for agricultural sprays, a self-emulsifying composition, characterized in emulsified form by stability in the presence of the impurities of hard or natural water, which comprises in admixture about 15 to about 40 parts of at least one member of the group consisting of rosin, glycerol esters of rosin and diethylene glycol esters of rosin, about 10 to about 35 parts of at least one wetting agent of the group consisting of sulfation products of aliphatic compounds which contain an alcoholic radical of more than 7 carbon atoms and alkyl-naphthalene-alkali sulfonates, about 5 to about 20 parts of water, paraffin oil and a monohydric alcohol of not more than three carbon atoms, said paraffin oil and alcohol amounting to about 20 to 50 parts of which at least about two-fifths is alcohol and in which the paraffin oil is present in an amount sufficient to impart stickiness, all parts being by weight.

5. As a spreading and sticking agent for agricultural sprays, a self-emulsifying composition, characterized in emulsified form by stability in the presence of the impurities of hard or natural water, which comprises in admixture rosin, rosin ester of diethylene glycol, a sulfation product of oleyl acetate, paraffin oil, ethyl alcohol and water, the rosin and rosin ester of diethylene glycol amounting to about 15 to about 40 parts, the sulfation product of oleyl acetate to about 10 to about 35 parts, the paraffin oil and ethyl alcohol to about 20 to about 50 parts of which at least about two-fifths is ethyl alcohol and the water to about 5 to 20 parts, all parts being by weight.

6. The method of preparing a stable emulsion useful as a coating composition which consists of mixing together about 15 to about 40 parts of at least one member of the group consisting of rosin, glycerol esters of rosin and diethylene glycol esters of rosin, about 10 to about 35 parts of at least one wetting agent of the group consisting of sulfation products of aliphatic compounds which contain an alcoholic radical of more than 7 carbon atoms and alkyl-naphthalene-alkali-sulfonates, about 20 to about 50 parts of a composition consisting of from about two-fifths to five-fifths of at least one primary monohydric alcohol of not more than three carbon atoms, the balance being a paraffin oil, and about 5 to about 20 parts of water, and then diluting the resulting mixture with a large volume of water, all parts being by weight.

7. The method of preparing a stable emulsion useful as a coating composition which consists of mixing together about 15 to about 40 parts of at least one member of the group consisting of rosin, glycerol esters of rosin and rosin ester of diethylene glycol, about 10 to about 35 parts of at least one wetting agent of the group consisting of sulfation products of aliphatic compounds which contain an alcoholic radical of more than 7 carbon atoms and is propyl-naphthalene-sodium-sulfonate, about 20 to about 50 parts of a composition consisting of from about two-fifths to five-fifths of at least one primary monohydric alcohol of not more than three carbon atoms, the balance being a paraffin oil, and about 5 to about 20 parts of water, and then diluting the resulting mixture with a large volume of water; all parts being by weight.

8. The method of preparing an emulsion characterized by stability in the presence of the impurities of hard or natural water, which comprises mixing together about 15 to about 40 parts of at least one member of the group consisting of rosin, glycerol esters of rosin and diethylene glycol esters of rosin, about 10 to about 35 parts of at least one wetting agent of the group consisting of sulfation products of aliphatic compounds which contain an alcoholic radical of more than 7 carbon atoms and alkyl-naphthalene-alkali sulfonates, about 5 to about 20 parts of water, paraffin oil and a monohydric alcohol of not more than three carbon atoms, said paraffin oil and alcohol amounting to about 20 to 50 parts of which at least about two-fifths is alcohol and in which the paraffin oil is present in an amount sufficient to impart stickiness, and then diluting the resulting mixture with a large volume of water, all parts being by weight.

9. The method of preparing an emulsion characterized by stability in the presence of the impurities of hard or natural water, which comprises mixing together rosin, rosin ester of diethylene glycol, a sulfation product of oleyl acetate, paraffin oil, ethyl alcohol and water, the rosin and rosin ester of diethylene glycol amounting to about 15 to about 40 parts, the sulfation product of oleyl acetate to about 10 to about 35 parts, the paraffin oil and ethyl alcohol to about 20 to about 50 parts of which at least about two-fifths is ethyl alcohol and the water to about 5 to 20 parts, and then diluting the resulting mixture with a large volume of water, all parts being by weight.

10. As a spreading and sticking agent for agricultural sprays, a self-emulsifying composition characterized in emulsified form by its stability in the presence of either weak acids or the impurities of hard or natural water or in the presence of both which comprises in admixture about 20 parts of rosin, about 20 parts of a rosin ester of diethylene glycol, about 15 parts of paraffin oil, about 24.5 parts of a sulfation product of oleyl acetate, about 10 parts of ethyl alcohol, and about 10.5 parts of water, all parts being by weight.

WENDELL H. TISDALE.
ALBERT L. FLENNER.